United States Patent
Chen

(10) Patent No.: US 11,984,276 B2
(45) Date of Patent: May 14, 2024

(54) KEY STRUCTURE WITH DISPLAY PANEL

(71) Applicant: Acer Incorporated, New Taipei (TW)

(72) Inventor: Hung-Chi Chen, New Taipei (TW)

(73) Assignee: Acer Incorporated, New Taipei (TW)

(*) Notice: Subject to any disclaimer, the term of this patent is extended or adjusted under 35 U.S.C. 154(b) by 349 days.

(21) Appl. No.: 17/477,517

(22) Filed: Sep. 16, 2021

(65) Prior Publication Data

US 2022/0367130 A1 Nov. 17, 2022

(30) Foreign Application Priority Data

May 17, 2021 (TW) ................................ 110117823

(51) Int. Cl.
| | |
|---|---|
| *G06F 1/16* | (2006.01) |
| *H01H 13/04* | (2006.01) |
| *H01H 13/14* | (2006.01) |
| *H01H 13/20* | (2006.01) |
| *H01H 13/86* | (2006.01) |

(52) U.S. Cl.
CPC ........... *H01H 13/04* (2013.01); *G06F 1/1662* (2013.01); *H01H 13/14* (2013.01); *H01H 13/20* (2013.01); *H01H 13/86* (2013.01); *H01H 2233/07* (2013.01)

(58) Field of Classification Search
None
See application file for complete search history.

(56) References Cited

U.S. PATENT DOCUMENTS

| 10,957,501 | B1* | 3/2021 | Brandt | G06F 3/0202 |
| 2019/0172664 | A1* | 6/2019 | Chen | H01H 13/84 |
| 2021/0294430 | A1* | 9/2021 | Smith | G06F 3/021 |
| 2022/0028629 | A1* | 1/2022 | Thrien | H01H 3/122 |

* cited by examiner

*Primary Examiner* — Anthony Q Edwards
*Assistant Examiner* — Rashen E Morrison
(74) *Attorney, Agent, or Firm* — JCIPRNET

(57) ABSTRACT

A key structure with display panel, including a display panel, a transparent keycap, and a scissors assembly, is provided. The transparent keycap is disposed above the display panel. An image generated by the display panel is projected out of the key structure through the transparent keycap. The scissors assembly is disposed between the display panel and the transparent keycap and exposes a display surface of the display panel.

15 Claims, 5 Drawing Sheets

KEY STRUCTURE WITH DISPLAY PANEL

CROSS-REFERENCE TO RELATED APPLICATION

This application claims the priority benefit of Taiwan application serial no. 110117823, filed on May 17, 2021. The entirety of the above-mentioned patent application is hereby incorporated by reference herein and made a part of this specification.

BACKGROUND

Technical Field

The disclosure relates to a key structure, and particularly relates to a key structure with display panel.

Description of Related Art

In the prior art, the keyboard has multiple keys, and at least one text or pattern is printed on the keycap of each key to provide the key with a specific input function and allow the user to identify the input function thereof. However, the text or pattern on each keycap is set before the product leaves the factory and cannot be defined by the user himself. Although some keyboards are equipped with additional macro keys to allow the user to switch the input commands corresponding to the key bodies by himself, the images thereon cannot be changed accordingly, so the user cannot know the input commands corresponding to the current key bodies at once.

Furthermore, although the existing luminous keyboard can emit light when in use or when required by the user, similar to the above, the luminous effect thereof is also set before the product leaves the factory and cannot be adjusted according to user requirements.

Accordingly, how to improve the visual limitation of the keyboard or keys regarding the text or pattern thereof and enable the keyboard or keys to be freely defined by the user as required has become a topic for persons skilled in the art to ponder and solve.

SUMMARY

The disclosure provides a key structure with display panel, which provides a definable identification text or pattern while providing a stable pressing sensation for the user.

The key structure with display panel of the disclosure includes a display panel, a transparent keycap, and a scissors assembly. The transparent keycap is disposed above the display panel. An image generated by the display panel is projected out of the key structure through the transparent keycap. The scissors assembly is disposed between the display panel and the transparent keycap and exposes a display surface of the display panel.

Based on the above, the key structure with display panel of the disclosure is disposed with the display panel on the base, so that the image generated by the display panel is sent upward and projected out of the key structure through the transparent keycap to provide the user with the required and easily recognized text or pattern. At the same time, the scissors assembly is disposed between the transparent keycap and the display panel to provide support while exposing the display surface of the display panel, so that the image is sent from the display surface to the transparent keycap without being affected.

DETAILED DESCRIPTION OF DISCLOSED EMBODIMENTS

Figure 1:
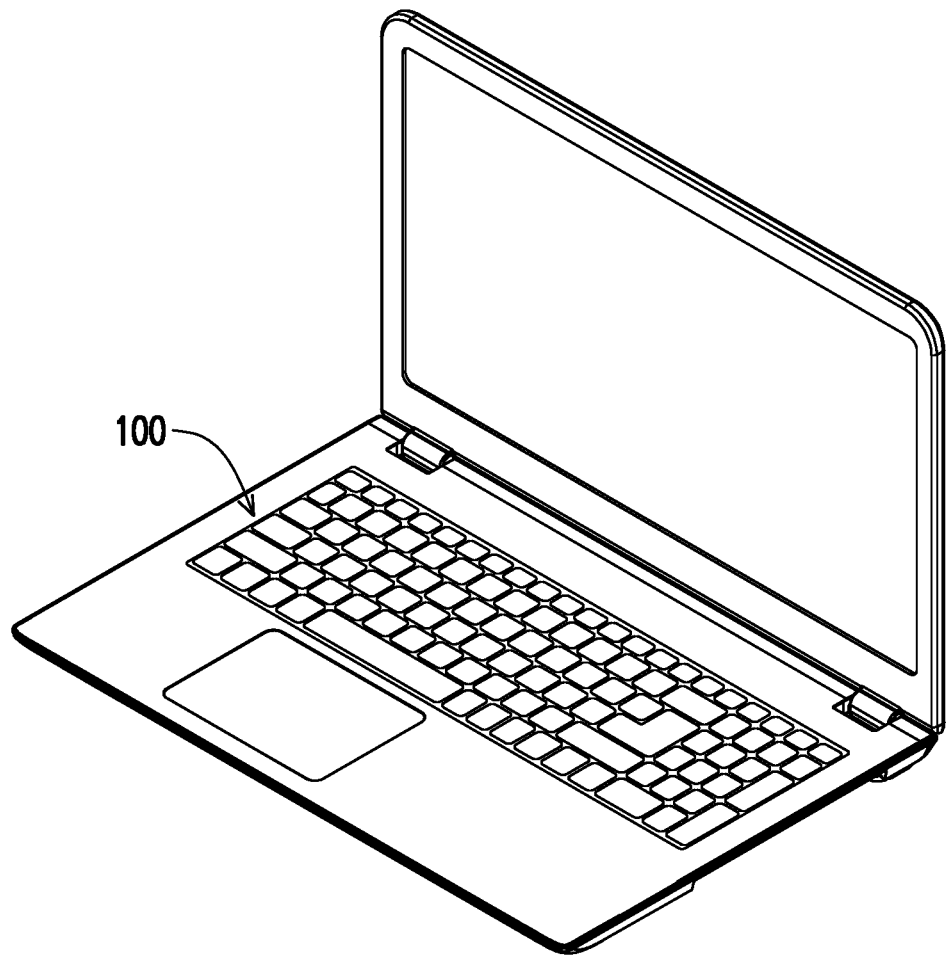
FIG. 1 is a schematic view of a keyboard according to an embodiment of the disclosure.
Figure 2:
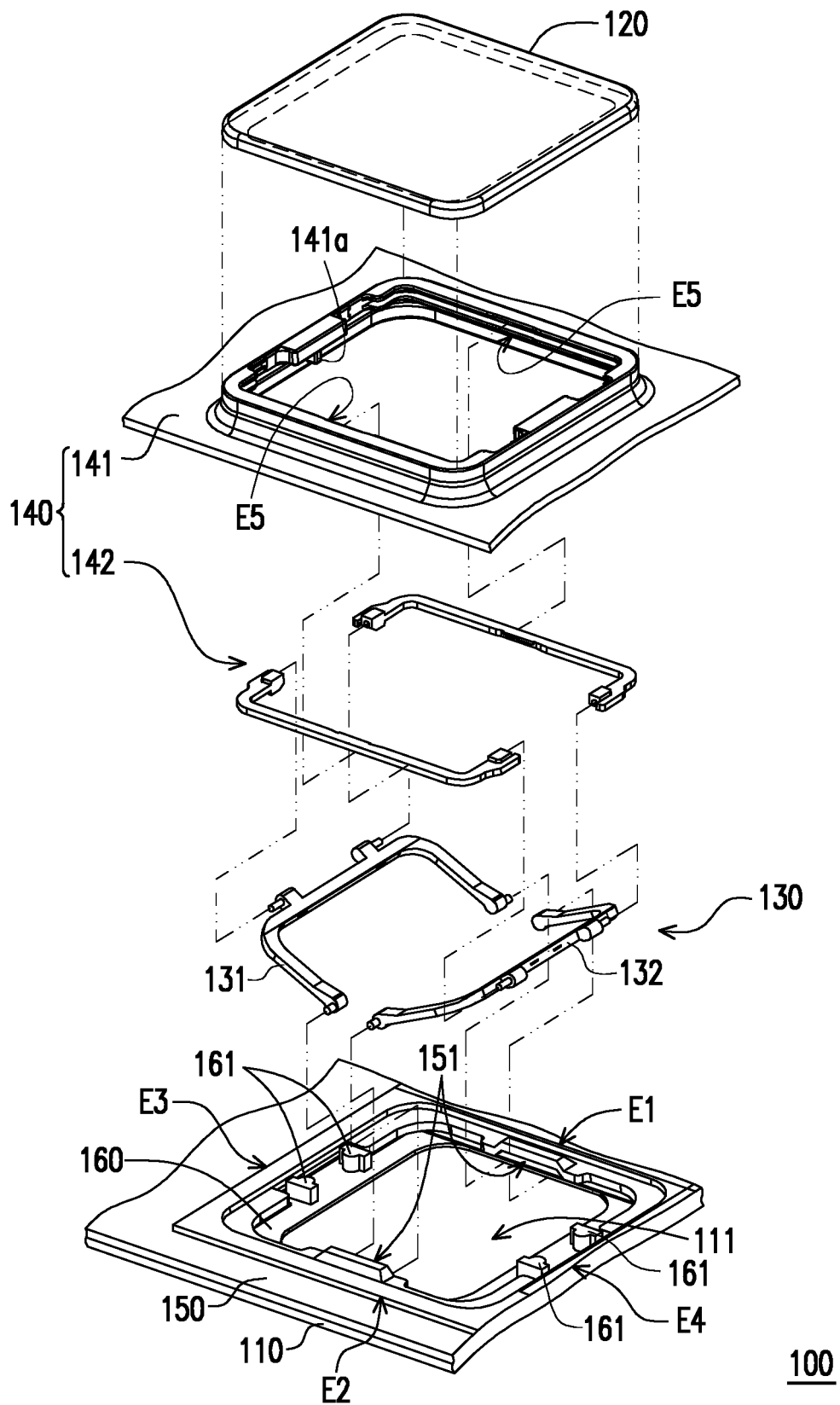
FIG. 2 is an exploded view of one of multiple key structures of the keyboard of FIG. 1.

FIG. 1 is a schematic view of a keyboard according to an embodiment of the disclosure. FIG. 2 is an exploded view of one of multiple key structures of the keyboard of FIG. 1. Please refer to FIG. 1 and FIG. 2 at the same time. In this embodiment, a key structure 100 is, for example, adapted to a keyboard of an electronic device 10 (a notebook computer). That is, the keyboard as shown in FIG. 1 is composed of multiple key structures 100. The key structure 100 includes a display panel 110, a transparent keycap 120, and a scissors assembly 130. The transparent keycap 120 is disposed above the display panel 110. An image generated by the display panel 110 is projected out of the key structure 100 through the transparent keycap 120. The scissors assembly 130 is disposed between the display panel 110 and the transparent keycap 120 to support the transparent keycap 120 above the display panel 110. At the same time, the scissors assembly 130 exposes a display surface 111 of the display panel 110.

Here, the display panel 110 is, for example, an electronic paper or electronic ink (E-paper or E-ink) display panel, an organic light-emitting diode (OLED) display panel, or other types of display panels, and the display surface 111 directly faces the transparent keycap 120 to allow the user to see the image generated from the display surface 111 through the transparent keycap 120.

Please refer to FIG. 2 again. In detail, the key structure 100 of this embodiment further includes a base plate 150, a thin-film circuit 160, and an elastic support 140. The base plate 150 is, for example, made of metal, and is disposed on the display panel 110 and has a hollow structure to expose the display surface 111. The thin-film circuit 160 is disposed on the base plate 150 and also has a hollow structure to expose the display surface 111. The elastic support 140 is disposed on the thin-film circuit 160 and also has a hollow structure to expose the display surface 111.

Figure 3:
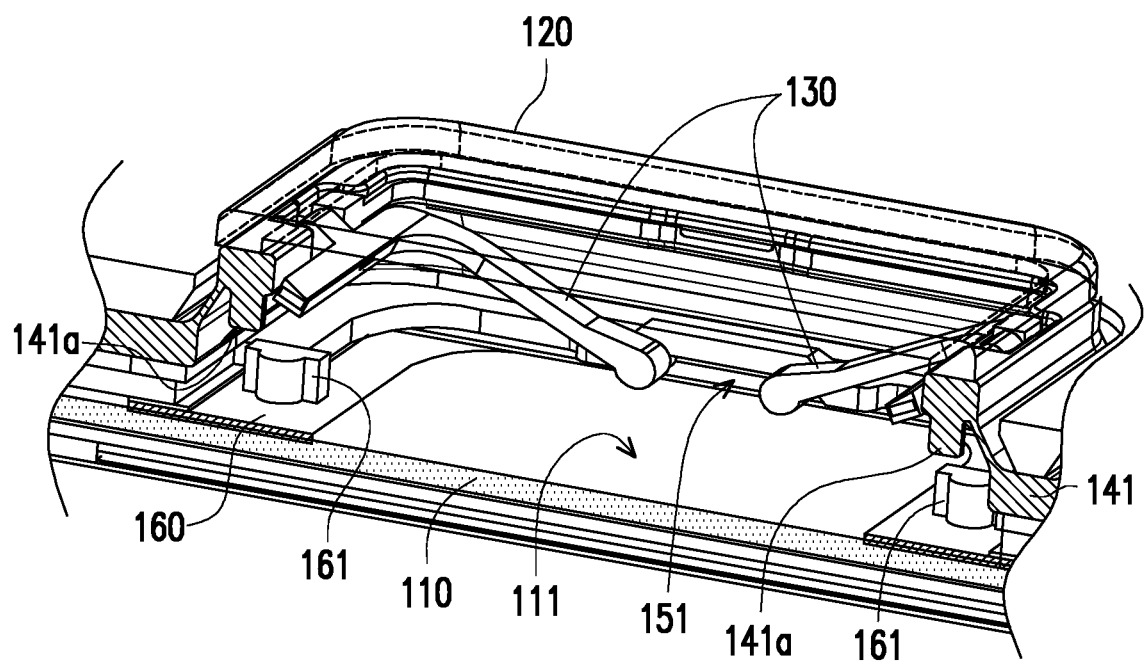
FIG. 3 is a cross-sectional view of one of the key structures of the keyboard of FIG. 1.

Furthermore, the elastic support 140 includes an elastic body 141 and an auxiliary member 142. The material of the elastic body 141 is, for example, silicon rubber, and the material of the auxiliary member 142 is, for example, plastic, so that the auxiliary member 142 may be combined with an inner side E5 of the elastic body 141 by insert molding. Here, the inner side E5 refers to the inner wall of the hollow structure. FIG. 3 is a cross-sectional view of one of the key structures of the keyboard of FIG. 1. Here, in order to facilitate identification, only the cross-sectional lines of relevant components are drawn and the cross-sectional lines of other irrelevant components are omitted. Please refer to FIG. 2 and FIG. 3 at the same time. In this embodiment, the base plate 150 has a pair of guide grooves 151, which are substantially located on two opposite sides E1 and E2 outside the display surface 111. The elastic body 141 substantially envelops four adjacent sides E1 to E4 outside the display surface 111. The auxiliary member 142 of this embodiment is substantially located on the two opposite sides E1 and E2, and the left and right ends thereof extend to the other two opposite sides E3 and E4 to form a pivot structure. The scissors assembly 130 includes a part 131 and a part 132 symmetrical to each other. The two opposite ends of each of the parts 131 and 132 are movably and pivotably connected to the guide groove 151, and the middle section of each of the parts 131 and 132 has a pivot structure, so as to be pivotally connected and combined with the pivot structure of the auxiliary member 142. The transparent keycap 120 is joined (attached) to the top surface of the elastic body 141. The assembly relationship between the above components may be clearly seen from the assembly lines in FIG. 2.

Based on the component configuration above, when the user applies force and presses the transparent keycap 120, it is equivalent to applying force to press down the elastic body 141 to generate collapsing elastic deformation (and accumulate elastic force), so as to drive the scissors assembly 130 to generate synchronous pivoting. The synchronous pivoting of the scissors assembly 130 enables the transparent keycap 120 to stably move down without deflection during the process of being pressed. Once the user removes the applied force, the elastic body 141 may restore (reset) the transparent keycap 120 and the scissors assembly 130 with the elastic force thereof.

In addition, the thin-film circuit 160 of this embodiment further has a switch 161, which is located on the periphery of the display surface 111. The elastic body 141 of the elastic support 140 also has a protrusion 141a, which extends toward the switch 161. Here, the switch 161 is an optical switching that is, for example, composed of a light emitting unit and a light receiving unit arranged opposite to each other, and the movement path of the protrusion 141a is on the light path of the light emitting unit and the light receiving unit. In this way, when the key structure 100 is pressed such that the elastic support 140 is elastically deformed, the protrusion 141a can be synchronously driven to move between the light emitting unit and the light receiving unit to form a shield, so as to trigger the switch 161. Once the user removes the applied force, the elastic body 141 can reset the transparent keycap 120 by the elastic force, so that the protrusion 141a is also moved away and releases the triggering of the switch 161.

In this embodiment, the thin-film circuit 160 has the pair of switches 161 located on the side E3 and the side E4 to ensure the triggering effect generated by the user during the pressing process. In other words, for the pair of switches 161 of this embodiment, only one of the switches 161 needs to be triggered during the pressing process to complete the triggering action of the key structure 100.

Figure 4:
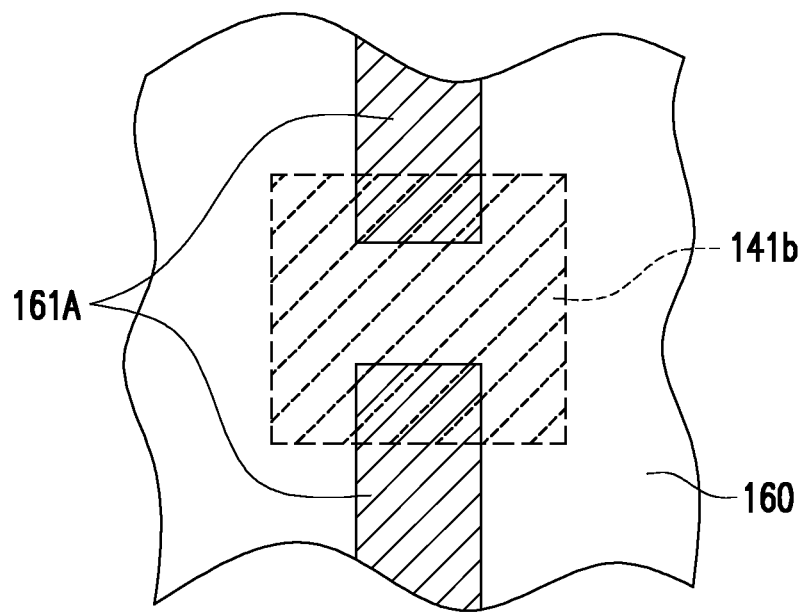
FIG. 4 is a top view of a thin-film circuit according to another embodiment of the disclosure.

FIG. 4 is a top view of a thin-film circuit according to another embodiment of the disclosure. Please refer to FIG. 4. The difference from the foregoing embodiment is that a switch 161A of the thin-film circuit 160 of the key structure of this embodiment is a conductive pad switch that is composed of a pair of conductive pads electrically disconnected from each other, and the bottom of a protrusion 141b of the elastic body is disposed with another conductive pad. In this way, when the key structure is pressed, the protrusion 141b abuts onto the pair of conductive pads, so that the pair of conductive pads are electrically conducted with each other through the conductive pad of the protrusion 141b to complete the triggering effect of the switch 161A. Here, reference may be made to FIG. 2 and FIG. 3 for the positions of the switch 161A and the thin-film circuit 160.

Figure 5:
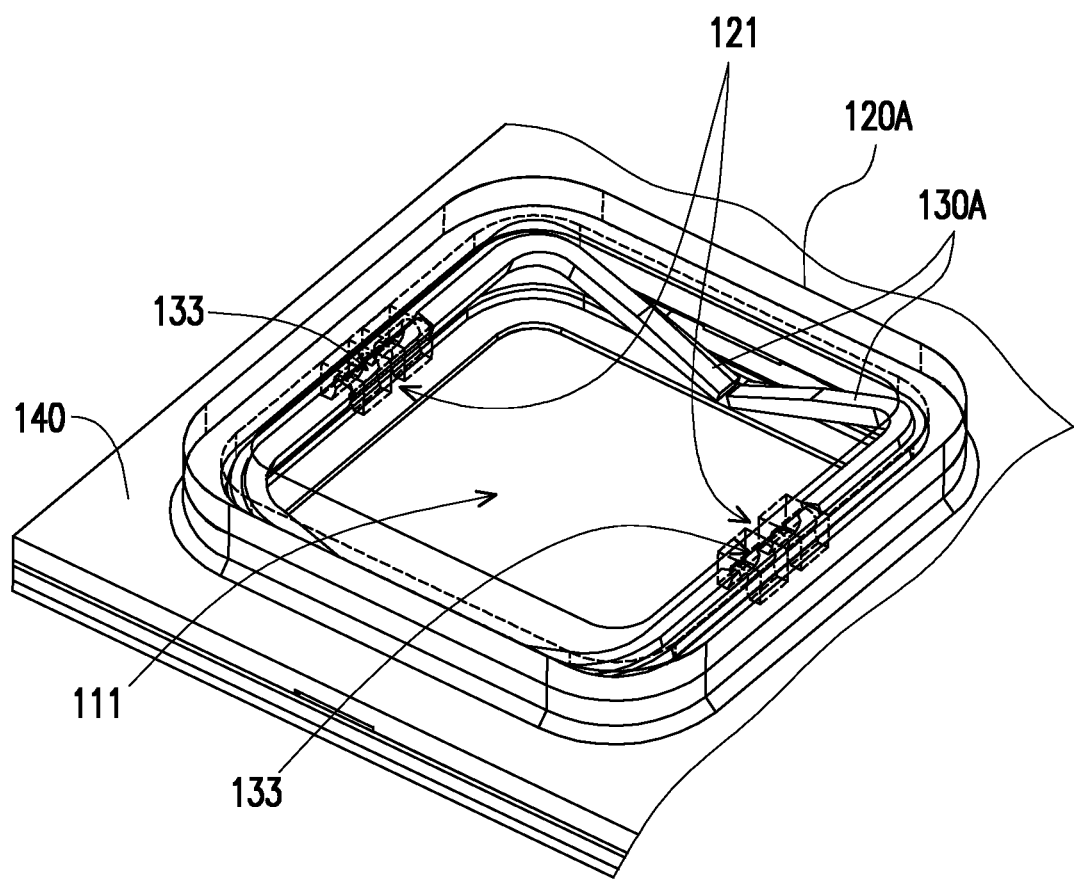
FIG. 5 is a schematic view of a key structure according to another embodiment of the disclosure.

FIG. 5 is a schematic view of a key structure according to another embodiment of the disclosure. Please refer to FIG. 5 and compare with FIG. 2 or FIG. 3. Unlike the foregoing embodiment in which the scissors assembly 130 is pivotally connected to the auxiliary member 142 of the elastic support 140, a scissors assembly 130A of this embodiment is directly pivotally connected to the inner surface of a transparent keycap 120A. As shown in FIG. 5, the inner surface of the transparent keycap 120A has a pair of buckling portions 121, which are configured to respectively pivotably buckle onto a pivot shaft 133 on a part of the scissors assembly 130A. At the same time, the transparent keycap 120A of this embodiment is also attached to the top surface of the elastic body 140. Accordingly, the key structure of this embodiment can still achieve the same action course as the foregoing embodiment.

Figure 6A:
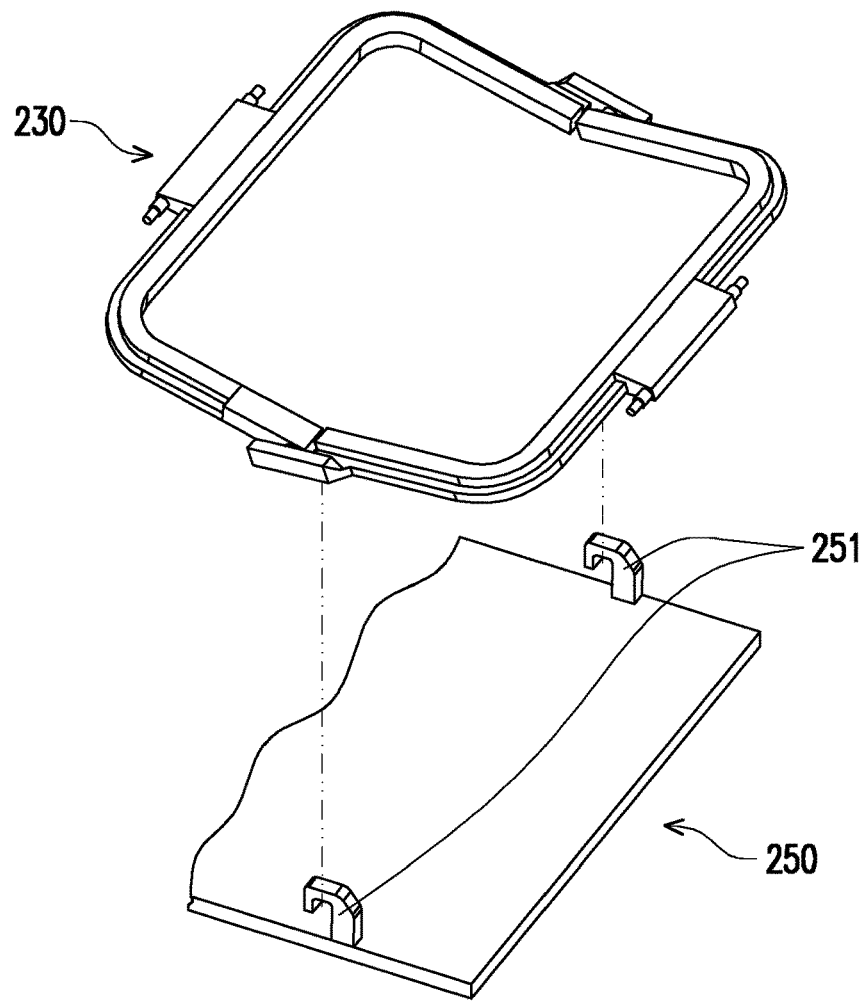
FIG. 6A is a schematic view of partial components of a key structure according to another embodiment of the disclosure.
Figure 6B:
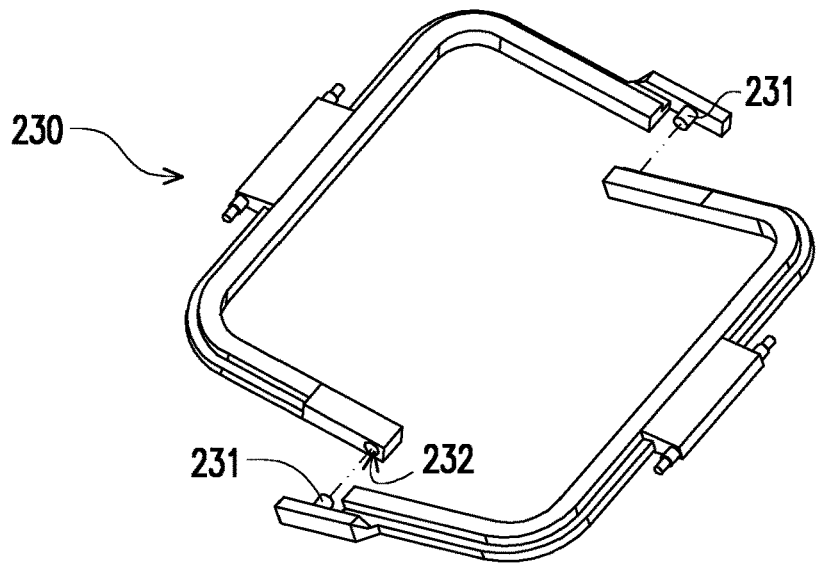
FIG. 6B is an exploded view of a scissors assembly of FIG. 6A.

FIG. 6A is a schematic view of partial components of a key structure according to another embodiment of the disclosure. FIG. 6B is an exploded view of a scissors assembly of FIG. 6A. Please refer to FIG. 6A and FIG. 6B at the same time. The difference from the foregoing embodiment is that a scissors assembly 230 of this embodiment includes a pair of parts pivotally connected to each other, and each part has a corresponding pivot post 231 and pivot hole 232, and as shown in FIG. 6A, after the pair of parts are pivotally connected to each other, an exposed portion of the pivot post 231 can be further buckled onto a pair of hooks 251 of a base plate 250, so that the scissors assembly 230 is pivotally disposed on the base plate 250. In addition, the base plate 250 of this embodiment is the same as the base plate 150 of the foregoing embodiment.

Please refer to FIG. 1 and FIG. 2 again. In this embodiment, although FIG. 2 to FIG. 6B above only show a portion of the single key structure, the same may still be applied to the keyboard formed by the multiple key structures 100 shown in FIG. 1. Furthermore, it is obviously expected that once an integrated composition formed by the multiple key structures 100 is adopted, the display panel 110, the base plate 150, the thin-film circuit 160, and the elastic support 140 of the key structure may adopt an integral structure to save production costs and simplify assembly procedures. For example, the display panel 110 may adopt an array structure of multiple display surfaces 111, which is also applicable to the base plate 150, the thin-film circuit 160, and the elastic support 140, each of which has an integral structure and has multiple openings to expose the display surfaces 111.

In summary, in the embodiments of the disclosure, the key structure with display panel of the disclosure is disposed with the display panel on the base, so that the image generated by the display panel is sent upward and projected out of the key structure through the transparent keycap to provide the user with the required and easily recognized text or pattern. At the same time, the scissors assembly is disposed between the transparent keycap and the display panel to provide support while exposing the display surface of the display panel, so that the image is sent from the display surface to the transparent keycap without being affected.

Furthermore, the key structure is also disposed with the elastic support between the display panel and the transparent keycap, and allows the elastic support to expose the display surface of the display panel, so that the image generated by the display panel can be smoothly projected to the transparent keycap. At the same time, the elastic support serves as the linkage mechanism of the key structure, so that when the key structure is pressed, the user actually collapses and elastically deforms the elastic support (and synchronously drives the scissors assembly) through applying force on the transparent keycap. Once the applied force by the user is removed, the elastic support can drive the transparent keycap (and the scissors assembly) to reset by the elastic force thereof.

What is claimed is:

1. A key structure with display panel, comprising:
    a display panel;
    a transparent keycap, disposed above the display panel, wherein an image generated by the display panel is projected out of the key structure through the transparent keycap;
    a scissors assembly, disposed between the display panel and the transparent keycap and exposing a display surface of the display panel;
    an elastic support, disposed on the display panel, connected to the transparent keycap, and exposing the display surface;
    an elastic body, disposed on the display panel; and
    at least one auxiliary member, disposed on the inner side and pivotally connected to the scissors assembly,
    wherein the scissors assembly is connected to an inner side of the elastic support,
    wherein the transparent keycap is connected to a top surface of the elastic body, and the elastic body has the inner side,
    wherein the elastic body is silicon rubber, and the at least one auxiliary member is plastic and is combined with the elastic body by insert molding.

2. The key structure with display panel according to claim 1, further comprising:
    a thin-film circuit, disposed on the display panel and exposing the display surface, wherein the elastic support is located on the thin-film circuit.

3. The key structure with display panel according to claim 2, wherein the thin-film circuit has a switch located outside the display surface, the elastic support further has a protrusion extending toward the switch, the key structure is pressed and the elastic support is elastically deformed and drives the protrusion to move toward and trigger the switch, and the key structure is not pressed and the elastic support is not elastically deformed and does not drive the protrusion to release triggering and move away from the switch.

4. The key structure with display panel according to claim 3, wherein the switch is an optical switch.

5. The key structure with display panel according to claim 3, wherein the switch is a conductive pad switch.

6. The key structure with display panel according to claim 2, further comprising:
    a base plate, disposed between the thin-film circuit and the elastic support, wherein one end of the scissors assembly away from the transparent keycap is slidably and pivotally connected to the base plate.

7. The key structure with display panel according to claim 1, wherein the scissors assembly is pivotally connected to the transparent keycap.

8. A key structure with display panel, comprising:
    a display panel, having a plurality of display surfaces;
    a plurality of transparent keycaps, disposed above the display panel, wherein the display surfaces respectively generate images to be projected out of the key structure through the transparent keycaps;
    a plurality of scissors assemblies, disposed between the display panel and the transparent keycaps and exposing the display surfaces;
    an elastic support, disposed on the display panel, connected to the transparent keycaps, and having a plurality of openings corresponding to and exposing the display surfaces;
    an elastic body, disposed on the display panel and having the openings; and
    a plurality of auxiliary members, disposed in pairs in the openings of the elastic body,
    wherein each of the scissors assemblies is connected to the elastic support and is located on an inner side of the opening,
    wherein the transparent keycaps are connected to a top surface of the elastic body,
    wherein each of the scissors assemblies is pivotally connected to the pair of auxiliary members of the same opening.

9. The key structure with display panel according to claim 8, wherein the elastic body is silicon rubber, and the auxiliary member is plastic and is combined with the elastic body by insert molding.

10. The key structure with display panel according to claim 8, further comprising:
    a thin-film circuit, disposed on the display panel and exposing the display surfaces, wherein the elastic support is located on the thin-film circuit.

11. The key structure with display panel according to claim 10, wherein the thin-film circuit has a plurality of switches located outside a range of each of the display surfaces, the elastic support further has a plurality of protrusions extending toward the switches, the key structure is pressed and the elastic support is elastically deformed and drives the protrusion to move toward and trigger the switch, and the key structure is not pressed and the elastic support is not elastically deformed and does not drive the protrusion to release triggering and move away from the switch.

12. The key structure with display panel according to claim 11, wherein each of the switches is an optical switch.

13. The key structure with display panel according to claim 11, wherein each of the switches is a conductive pad switch.

14. The key structure with display panel according to claim 10, further comprising:
    a base plate, disposed between the thin-film circuit and the elastic support, wherein one end of each of the scissors assemblies away from the transparent keycap is slidably and pivotally connected to the base plate.

15. The key structure with display panel according to claim 8, wherein the scissors assemblies are respectively and correspondingly pivotally connected to the transparent keycaps.

* * * * *